US009910581B2

(12) United States Patent
Morin et al.

(10) Patent No.: US 9,910,581 B2
(45) Date of Patent: Mar. 6, 2018

(54) VIDEO SCROLLING

(71) Applicant: Brit Media, Inc., San Francisco, CA (US)

(72) Inventors: Brittany Morin, Mill Valley, CA (US); Michael Schierberl, San Francisco, CA (US)

(73) Assignee: BRIT MEDIA, INC., San Francisco, CA (US)

( * ) Notice: Subject to any disclaimer, the term of this patent is extended or adjusted under 35 U.S.C. 154(b) by 302 days.

(21) Appl. No.: 14/699,816

(22) Filed: Apr. 29, 2015

(65) Prior Publication Data

US 2015/0309686 A1 Oct. 29, 2015

Related U.S. Application Data

(60) Provisional application No. 61/985,897, filed on Apr. 29, 2014.

(51) Int. Cl.
| | |
|---|---|
| *G06F 3/0485* | (2013.01) |
| *G06F 3/0484* | (2013.01) |
| *G06F 3/0482* | (2013.01) |
| *G06F 3/0488* | (2013.01) |
| *G06F 3/01* | (2006.01) |
| *H04N 21/472* | (2011.01) |
| *H04N 21/422* | (2011.01) |

(52) U.S. Cl.
CPC ............ *G06F 3/0485* (2013.01); *G06F 3/017* (2013.01); *G06F 3/0488* (2013.01); *G06F 3/04847* (2013.01); *H04N 21/47217* (2013.01); *H04N 21/42224* (2013.01)

(58) Field of Classification Search
CPC .... G06F 3/017; G06F 3/04847; G06F 3/0485; G06F 3/0488; H04N 21/42224; H04N 21/47217
See application file for complete search history.

(56) References Cited

U.S. PATENT DOCUMENTS

| | | | |
|---|---|---|---|
| 2006/0028454 A1 | 2/2006 | Branton et al. | |
| 2007/0220118 A1* | 9/2007 | Loyer | H04N 21/222 709/219 |
| 2010/0231536 A1 | 9/2010 | Chaudhri et al. | |
| 2013/0067332 A1* | 3/2013 | Greenwood | G06F 3/0485 715/720 |
| 2014/0310601 A1* | 10/2014 | Matejka | H04N 21/4314 715/720 |

* cited by examiner

*Primary Examiner* — Amy Ng
*Assistant Examiner* — Tan Tran
(74) *Attorney, Agent, or Firm* — David R. Stevens; Stevens Law Group (57) ABSTRACT

A system for video scrolling may allow a user to control speed and/or direction of video playback through user inputs. Such user inputs can include swiping one or more fingers on a touch-sensitive surface, clicking and dragging a computer mouse, or other input actions comprising lateral movements. The rate of playback can be configured based on the speed of the input action. In one embodiment, the user may play the video backward by reversing direction of the input action.

14 Claims, 10 Drawing Sheets

*FIG. 6C*

VIDEO SCROLLING

RELATED APPLICATION

This application claims the benefit of U.S. Provisional Application Ser. No. 61/985,897 filed Apr. 29, 2014 and entitled "Video Scrolling Systems and Methods."

BACKGROUND

In recent years, mobile computing devices have become ubiquitous. Worldwide, billions of mobile computing devices are used for not only communications, but entertainment. Such mobile computing devices may include, but are not limited to smartphones, tablets, e-readers, wearable computing devices such as smart glasses and smartwatches, and other types of mobile electronic computing devices.

Many mobile computing devices include a touch-sensitive display as a principal means for the user to interact with the mobile computing device. Inputs can be made by tapping and/or swiping the user's finger on the touch-sensitive display. Many mobile computing devices additionally have a forward-facing (i.e., user-facing) camera. The forward-facing camera can identify when certain hand gestures are made by the user and interpret gestures to specific inputs.

One common use of both mobile computing devices and traditional computing devices includes watching videos. Such videos may include user-generated content or videos created by traditional sources of video media. Millions of video segments are uploaded every day to video sharing websites, while an increasing amount of videos created by traditional media sources are made available for viewing on computing devices.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for video playback control. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

According to various embodiments of the present disclosure, systems and methods described herein may allow a user to laterally move an input object on an electronic computing device to scroll through frames of a video. In particular, a user can apply motion to an input of a computer device, such as a touchscreen or other input device, to direct video playback to match the direction and speed of the swipe. In one embodiment, the input comprises a swipe of the user's finger across a touch-sensitive display. In another embodiment, inputs can be made by a computer mouse, such as by clicking the computer mouse button and dragging the mouse cursor. As the user moves the input object, the video playback may be carried out at a user-controllable rate that corresponds to the speed and/or direction of movement of the input object. In various embodiments, input objects can comprise one or more fingers of the user, a computer mouse or other computer peripheral, the hand of the user, an eye of the user, the head of the user, or other objects through which an input action and/or motion may be input into the computing device.

Figure 1:
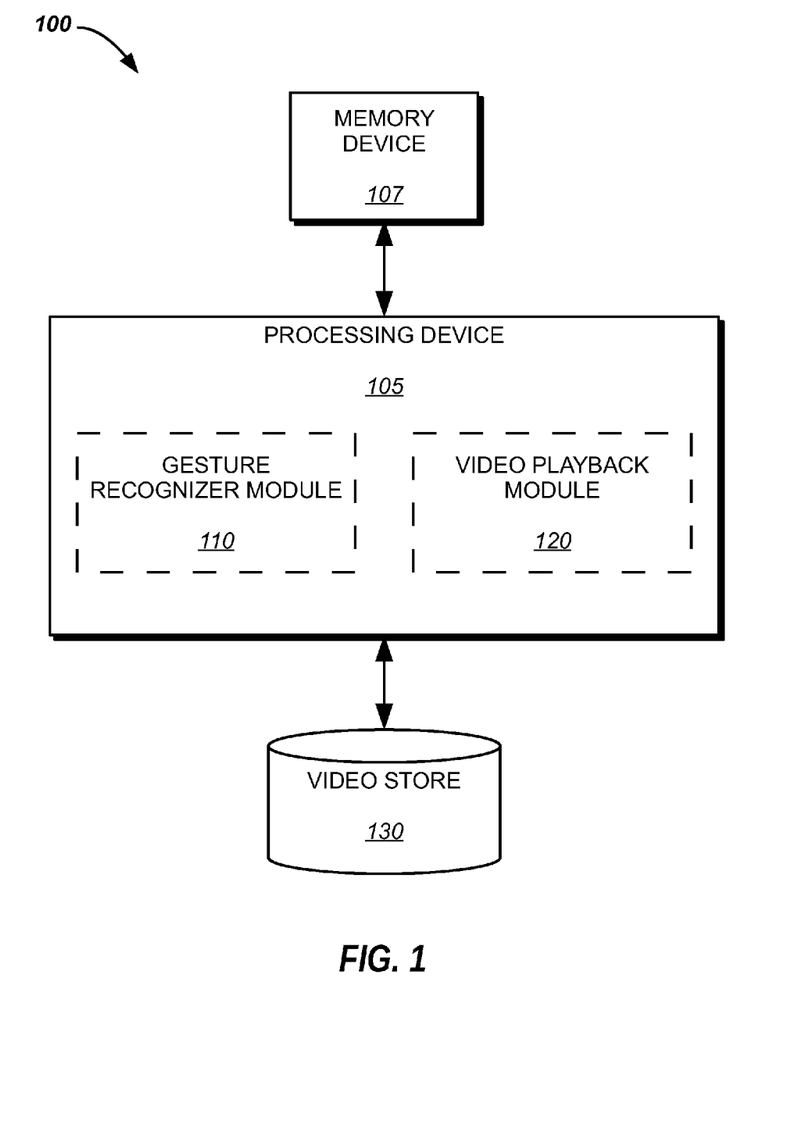
FIG. 1 is a block diagram illustrating a video scrolling server according to one embodiment of the present disclosure.

FIG. 1 is a block diagram depicting a video scrolling system 100 according to one embodiment of the present disclosure. In an embodiment, video scrolling system 100 includes a processing device 105 and memory device 107. In one embodiment, memory device 107 has computer-readable instructions to direct processing device 105 to include a gesture recognizer module 110 and a video playback module 120. In the illustrated embodiment, video scrolling system 100 further includes video store 130.

Any combination of one or more computer-usable or computer-readable media may be utilized in various embodiments of the present disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

According to an embodiment, gesture recognizer module 110 can detect user inputs. In particular embodiments, gesture recognizer module 110 can detect lateral movements of an input object according to an input action carried out by the user. In one embodiment, the input action comprises a swipe of a user's finger as detected by a touch-sensitive display on a smartphone or like mobile device. In another embodiment, the input action comprises a click and/or drag of a computer mouse. In various other embodiments, the input action comprises any one of a variety of panning type of movements. Input actions can include vertical or horizontal movements or combinations thereof.

In one embodiment, gesture recognizer module 110 is adapted to recognize an input action only while a user presses one or more fingers on a touch-sensitive surface while laterally sliding the one or more fingers across the touch-sensitive surface. In embodiments, an input action is defined by a minimum number of concurrent finger presses and sliding actions. For example, in one embodiment, gesture recognizer module 110 only recognizes an input action where at least three fingers simultaneously contact the touch-sensitive surface then slide across the touch-sensitive surface.

In embodiments, gesture recognizer module 110 is adapted to recognize an input action only after the input objects have moved at least a predetermined distance. In such embodiments, a threshold distance for input actions may reduce unintentional video scrolling.

In another embodiment, gesture recognizer module 110 is adapted to recognize a gesture incorporating an input action where no contact is made with the touch-sensitive surface, for example as could be captured by a forward-facing camera on a smartphone. In embodiments, such an input gesture comprises a particular hand position, placement, and/or movement to constitute an input action.

In one embodiment, an input action includes a sliding, dragging, and/or panning movement that can be recognized by gesture recognizer module 110. In one embodiment, such a movement comprises a continuous movement of the one or more input objects. In one embodiment, the input action begins when the minimum number of input objects (for example, the user's fingers) has moved far enough to meet the threshold distance. In one embodiment, gesture recognizer module 110 interprets that the input action has ended when all fingers are lifted from the touch-sensitive surface. Alternatively, gesture recognizer module 110 interprets that the input action has ended when the mouse button is no longer pressed.

In one embodiment, gesture recognizer module 110 is adapted to detect and/or measure direction, translation, and/or velocity of an input action. In an embodiment, translation may be measured as a distance from the input action starting point to a current location of the input object(s). In another embodiment, translation may be measured as a distance traversed by the input object(s). According to various embodiments of the present disclosure, gesture recognizer module 110 can save the coordinates of the start location of an input action. At any point during the input action, gesture recognizer module 110 can determine the current coordinates of an input object and calculate translation by subtracting starting coordinates from current coordinates. In embodiments, the coordinate field by which the input action is measured may overlay a video display view on a display of the computing device.

According to embodiments, video playback module 120 is operable to manage and play audio-visual media to the user according to input actions detected by gesture recognizer module 110. In one embodiment, the audio-visual media comprises one or more audio and/or video tracks. In one embodiment, the audio-visual media may be stored at video store 130. Video store 130 can hold data regarding the audio-visual media. In one embodiment, such data may include information such as title, duration, natural presentation size, and any other data that may be determined to be relevant. In various embodiments, video playback module 120 can request selected audio-visual media and/or data regarding selected audio-visual media from video store 130. Upon such a request, video store 130 can transmit the requested media and/or data to video playback module 120.

In embodiments, video playback module 120 is adapted to jump to any location on a video and display a portion of the video at that location. As the user carries out an input action, video playback module can direct the playback speed and/or direction to match the velocity and/or direction of the input action. According to various embodiments, video playback module 120 can display video in partial or full screen with the device in either landscape or portrait orientation. Such display options may be selected by the user and then implemented by video playback module 120.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 2:
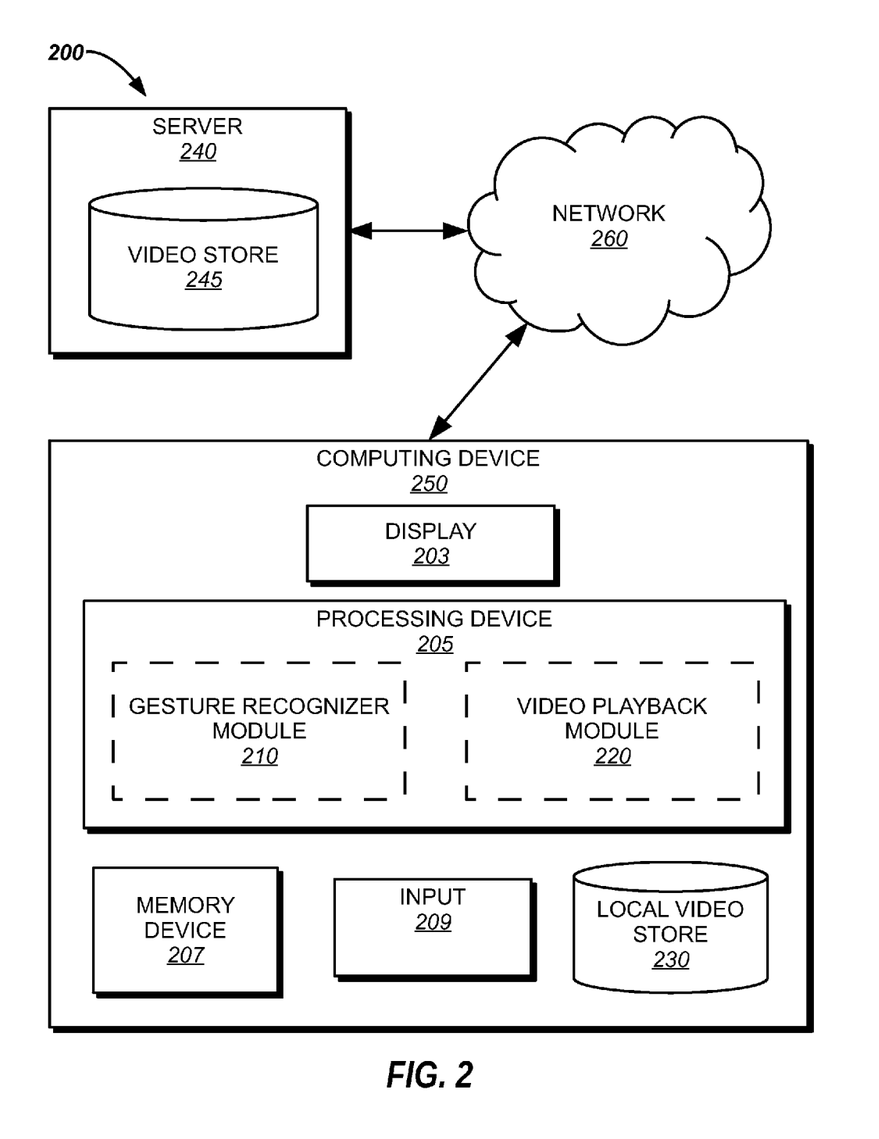
FIG. 2 is a schematic illustrating a video scrolling system according to one embodiment of the present disclosure.

FIG. 2 is an example schematic illustrating a video scrolling system 200 according to embodiments of the present disclosure. According to the embodiment depicted in FIG. 2, video scrolling system 200 includes server 240 and computing device 250, which can communicate with each other via a network 260. In an embodiment, server 240 comprises video store 245. Computing device 250 comprises display 203, processing device 205, memory device 207, input 209, and local video store 230.

Video store 245 includes audio-visual media and data regarding the audio-visual media. Video store 245 is adapted to transmit audio-visual media and associated data to local video store 230 over network 260. In one embodiment, a request for a selected video can be transmitted from computing device 250 to video store 245. In response to such a request, video store 245 can transmit the requested file(s) to local video store 230.

As the user carries out an input action, input 209 is adapted to detect said input action. In one embodiment, input 209 comprises a touch-sensitive screen on a smartphone or other computing device. Other embodiments comprise various types of input objects. Gesture recognizer module 210 is adapted to identify and measure the input action. As set forth above, in embodiments, the input action comprises a lateral movement of an input object. Gesture recognizer module 210 can identify the translation and velocity of the input action and transmit the parameters of the detected action to video playback module 220.

In one embodiment, video playback module 220 can receive data regarding the user input action and direct playback of the selected video to match the speed and/or direction of the input action. Video playback module 220 can direct playback of the video on display 203 according to the preferences of the user.

The signals transmitted between server 240 and computing device 250 can be transmitted through network 260. As used herein, the term "network" may include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

Figure 3:
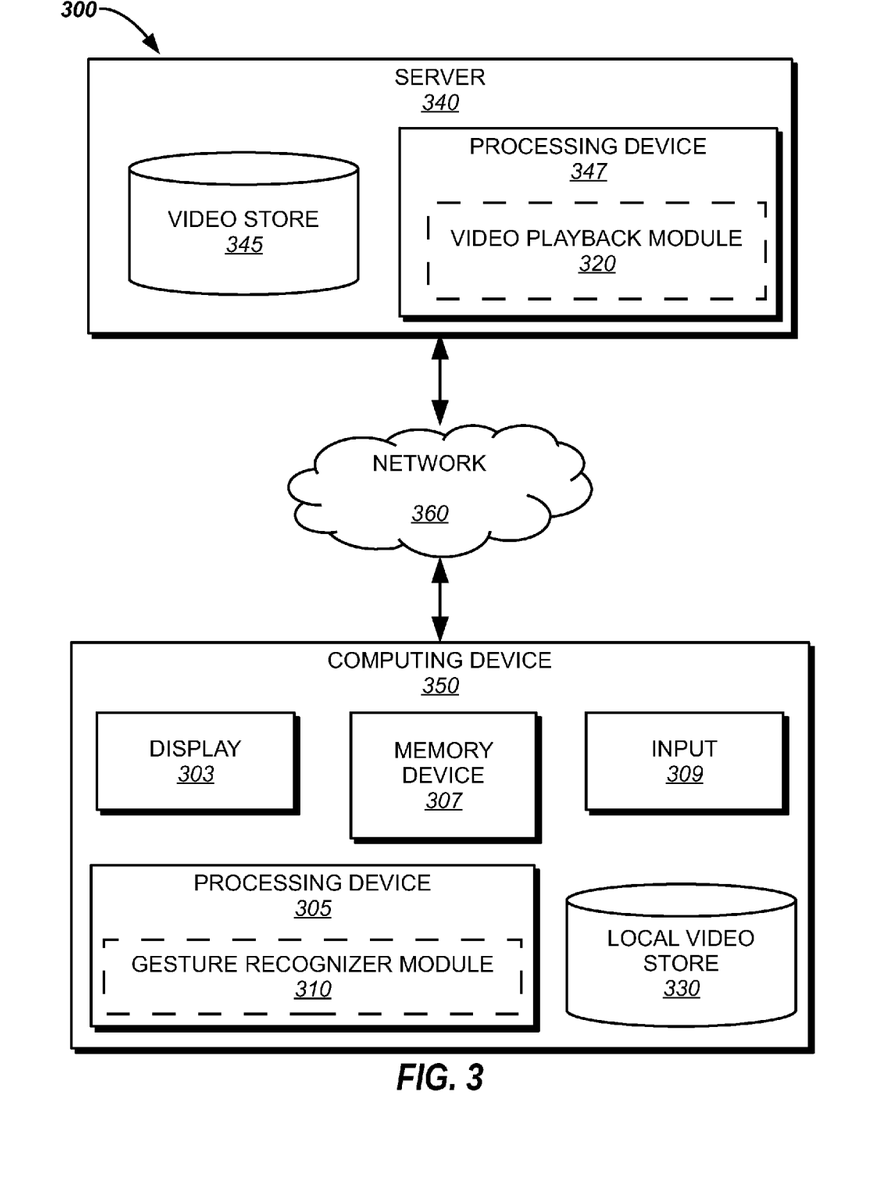
FIG. 3 is a schematic illustrating a video scrolling system according to another embodiment of the present disclosure.

FIG. 3 is an example schematic illustrating a video scrolling system 300 according to embodiments of the present disclosure. According to the embodiment depicted in FIG. 3, video scrolling system 300 includes server 340 and computing device 350, which can communicate with each other via network 360. In an embodiment, server 340 comprises video store 345 and processing device 347. Processing device 347 includes computer-readable instructions for video playback module 320.

Computing device 350 comprises display 303, processing device 305, memory device 307, input 309, and local video store 330. Video store 345 includes audio-visual media and data regarding the audio-visual media. Video store 345 is adapted to transmit audio-visual media and associated data to local video store 330 over network 360. In one embodiment, a request for a selected video can be transmitted from computing device 350 to video store 345. In response to such a request, video store 345 can transmit the requested file(s) to local video store 330.

As the user carries out an input action, input 309 is adapted to detect said input action. In one embodiment, input 309 comprises a touch-sensitive screen on a smartphone or other computing device. Other embodiments comprise various types of input objects. Gesture recognizer module 310 is adapted to identify and measure the input action. As set forth above, in embodiments, the input action comprises a lateral movement of an input object. Gesture recognizer module 310 can identify the translation and velocity of the input action and transmit the parameters of the detected input action to video playback module 320 over network 360.

In one embodiment, video playback module 320 can receive data regarding the user input action and direct playback of the selected video to match the speed and/or direction of the input action. Video playback module 320 can transmit signals over network 360 to direct playback of the video on a display 303 of the mobile computing device 360 according to the preferences of the user.

Figure 4:
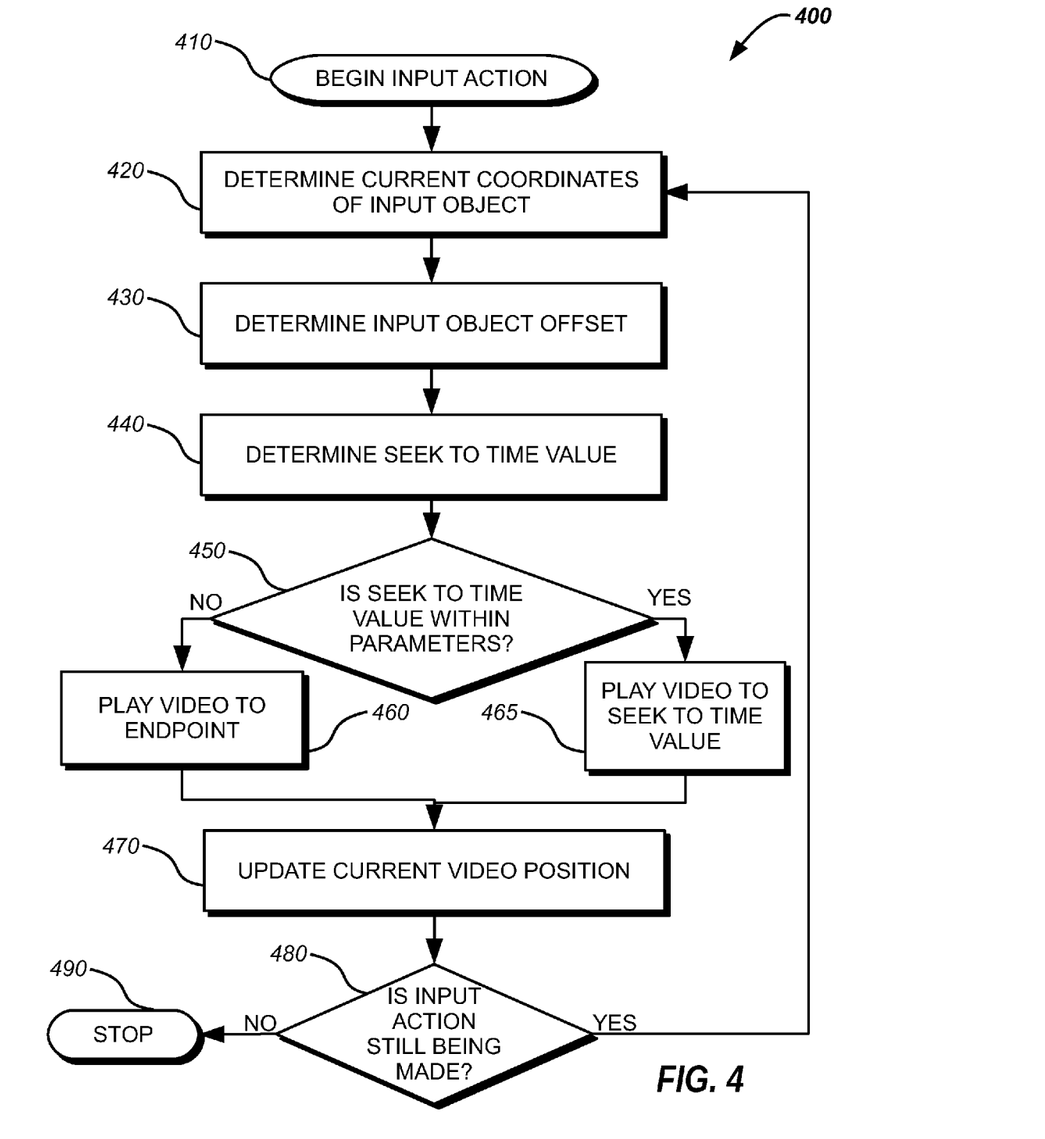
FIG. 4 is a flow chart illustration of a method of video scrolling according to one embodiment of the present disclosure.

In operation, embodiments of the present disclosure may receive a user input in the form of an input action having a translation and velocity and output a video, where the direction and speed of video playback is determined by the translation and/or velocity of the input action. Referring now to FIG. 4, a method 400 for providing video scrolling is depicted.

Method 400 begins at operation 410, where a user begins an input action. In one embodiment, such an input action can be defined by placement of a minimum number input objects, such as the user's fingers, on a touch-sensitive device. In another embodiment, an input action can be defined by pressing a computer mouse button or other input on a computer peripheral. In embodiments, an input action can be defined by a lateral movement of at least a threshold amount. Such a lateral movement may be a finger swipe on a touch-sensitive surface, a computer mouse click-and-drag, or other like movements. In one embodiment, the starting coordinates of the one or more input objects are determined and recorded.

At operation 420, as the user has laterally moved the input object(s), the new coordinates are determined and recorded. In one embodiment, the coordinates are plotted on a field comprising the video play window. In another embodiment, the coordinates are plotted on a field composed of the entire display viewed by the user. In another embodiment, the coordinates are plotted on a field that is at least partially within the video play window.

At operation 430, the current coordinates are compared to starting coordinates to determine the current offset (or distance) of the input action. In one embodiment, offset is calculated as a distance between beginning and current points. In another embodiment, the offset is calculated as a distance traversed by the input object(s). In some embodiments, where there are multiple input objects, the offset is calculated as an average of the offsets of each individual input object.

At operation 440, a "Seek To" time value is calculated from the input action offset. In one embodiment, the Seek To time value corresponds to the offset as a fraction of the size of the coordinate field. For example, consider a one-minute video recorded at 60 frames per second ("fps"). This video thus has a total of 3600 frames (60 frames/second×60 seconds=3600 frames). Consider an input action performed by a user swiping across a display that is 1136 pixels high, with 80% of the display height as the field for video playback and detection of input actions. In one embodiment, it may be selected that the user can scroll through the one-minute video by making ten full-length swipes. Thus, 9088 pixels can represent the cumulative vertical scrolling offset for the entire 3,600 frame sequence (80% of 1136 pixels/swipe×10 swipes/video=9088 pixels/video). Accordingly, for approximately every 2.5 pixels of offset, the video playback can be advanced by one frame (9088 pixels/3600 frames≈2.5 pixels/frame). In the present disclosure, the foregoing ratio may be referred to as the offset/scrolling ratio. In an alternative embodiment, other units of time may be used to calculate the offset/scrolling ratio instead of video frames.

As a person of ordinary skill in the art having the benefit of the present disclosure would appreciate, the offset/scrolling ratio may depend on the video length, the size of the input field, and the number of full-length swipes selected to be equivalent to the entire video length. In embodiments, as the user swipes or otherwise moves an input object to the right, the video will be played forward at a speed according to the calculated offset/scrolling ratio. In embodiments, as the user swipes or otherwise moves an input object to the left, the video will be played backward at a speed according to the calculated offset/scrolling ratio. In one embodiment, the offset/scrolling ratio is set at a different value for forward playback than the value for backward playback. In embodiments, the input actions may be carried out in multiple directions on the input field. For example, upward movements may correlate to forward playback, while downward movements may correlate to backward playback. An offset for a forward playback may be referred to herein as a positive offset, whereas an offset for a backward playback may be referred to herein as a negative offset.

In embodiments, the Seek To value is determined by dividing the current offset with the offset/scrolling ratio to result in a quantity of frames. The quantity of frames may be converted into a time interval using the framerate of the video. The quantity of frames or time interval may be equivalent to the length of video to be played to match the current offset. In one embodiment, the time interval may be added to or subtracted from the current video time to result in the Seek To time.

At operation 450, the Seek To time is compared to the length of the video. If the Seek To time for a forward-playing operation is greater than the length of the video, then operation passes to operation 460 and the video is played to the endpoint. Likewise, if the Seek To time for a backward-playing operation indicates a time that is outside the play time of the video (i.e., the Seek To time is less than zero), the operation passes to operation 460 and the video is played backward to the start of the video.

At operation 450, if the Seek To time is determined to be within the length of the video, then operation proceeds to operation 465, wherein the video is played to the Seek To time.

At operation 470, the current video position is updated based on the previous Seek To time and resulting playback at operation 460 or 465.

At operation 480, if the user continues to make an input action by further movement and/or holding of the input object(s), operation passes back to operation 420 to repeat that and the following operations. Repeated cycles may be made as the user continues to make an input action.

At operation 480, if the user has stopped making an input action by releasing the input object(s), method 400 stops at operation 490. In one embodiment, stopping the method indicates a pause of the video playback until further input is entered by the user. In another embodiment, upon reaching operation 490, video scrolling is ceased, but normal playback of the video may resume.

Figure 5A:
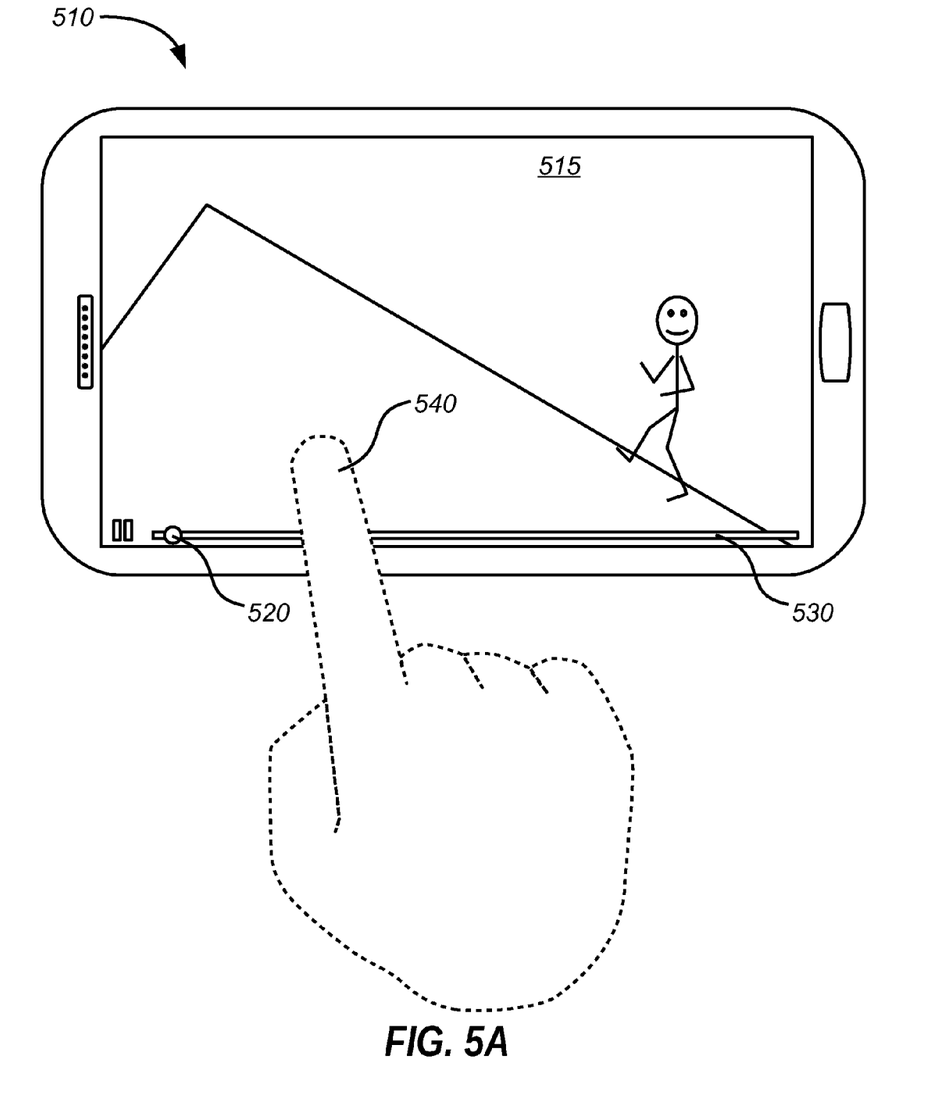
FIGS. 5A-5C are an illustration of a input action swipe to the right according to one embodiment of the present disclosure.
Figure 5B:
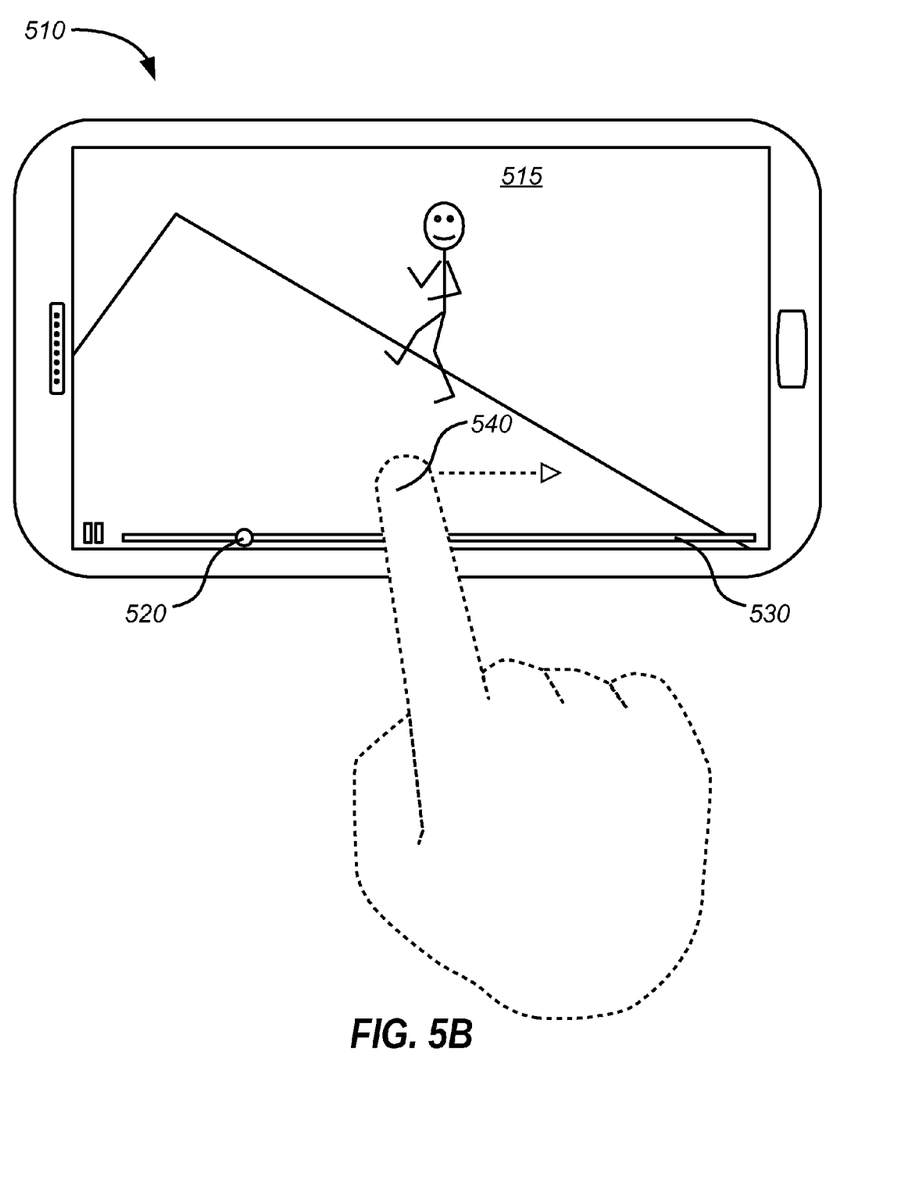
Figure 5C:
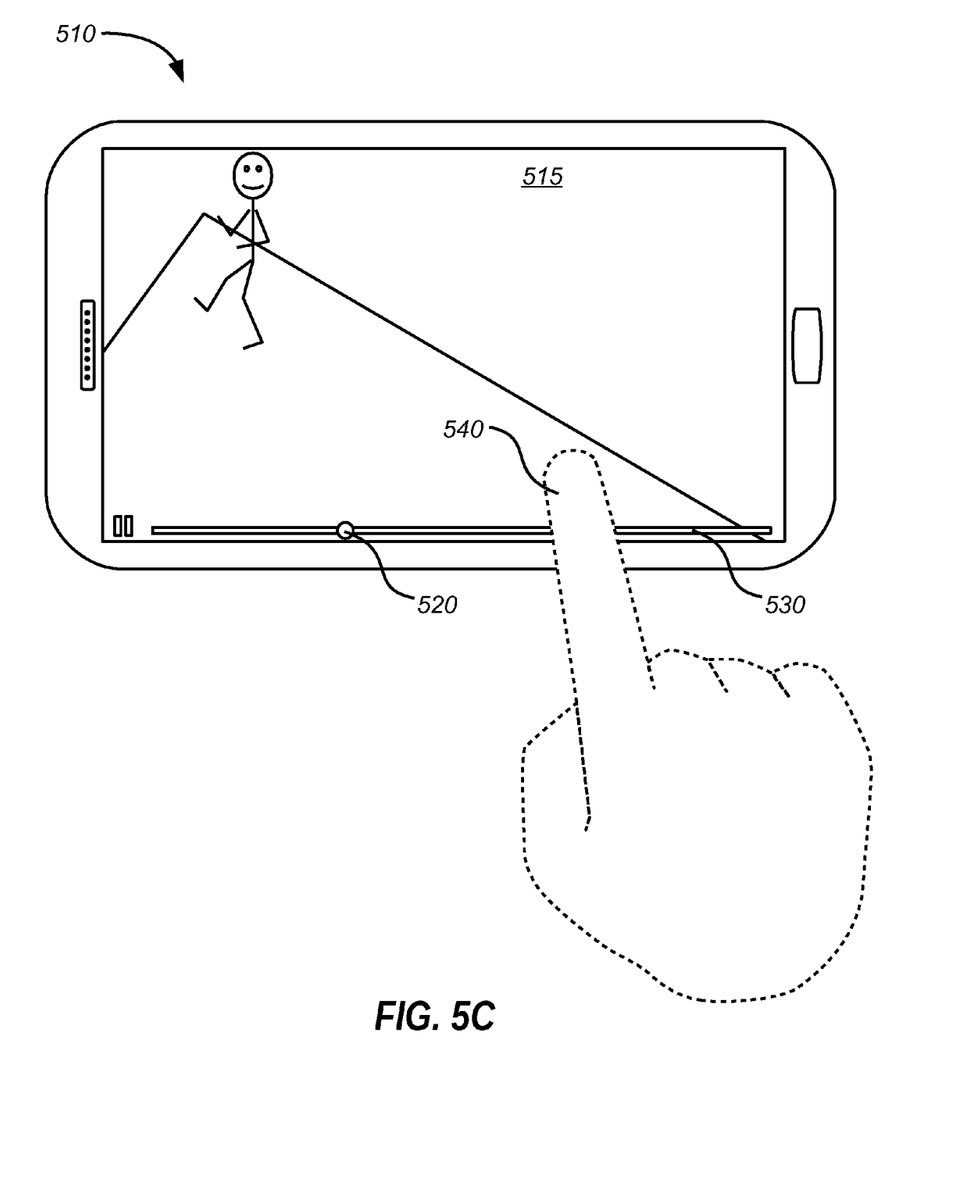

Referring now to FIGS. 5A-5C, a video is played on mobile computing device 510. In the embodiment depicted, the video window is expanded over the entire display 515 of computing device 510. Video progress bar 530 and video position indicator 520 indicate the video position relative to the entire video length.

In the embodiment depicted in FIG. 5A, a user has begun watching a video. If the user desires to scroll through at least a portion of the video, the user may begin making an input action by placing finger 540 on display 515. Referring to FIG. 5B, as the user begins swiping finger 540 to the right, playback of the video is advanced according to the offset/scrolling ratio. As the video advanced forward, video progress bar 530 and video position indicator likewise advance to reflect the video position 520. Referring to FIG. 5C, the user has swiped finger 540 to the right, thus further advancing forward playback of the video. In one embodiment, the user could advance the video in either direction by moving finger 540 left or right. In embodiments, if the user desired to play the video quickly, faster movements of finger 540 could be made, resulting in correspondingly faster video scrolling. Likewise, slower swiping of finger 540 can result in slower video scrolling.

Figure 6A:
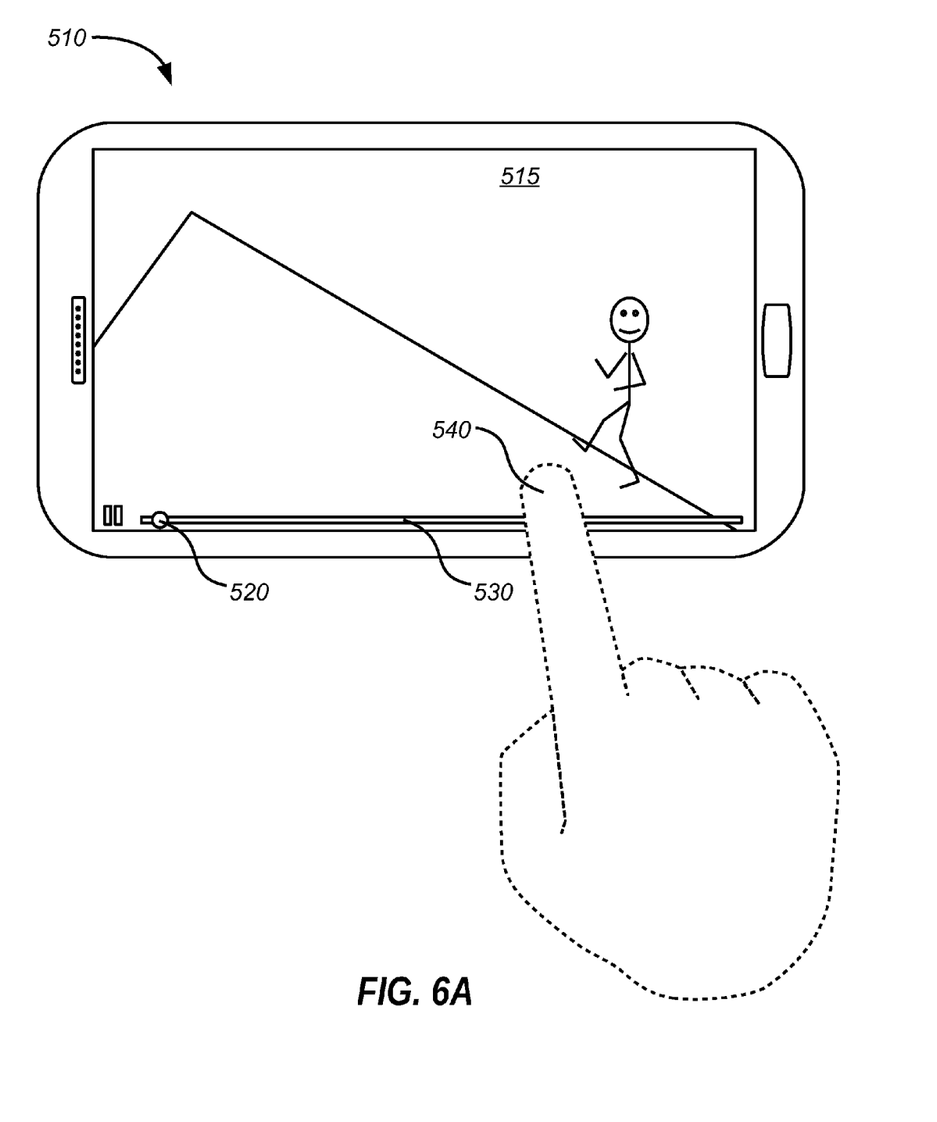
FIGS. 6A-6C are an illustration of a input action swipe up according to one embodiment of the present disclosure.
Figure 6B:
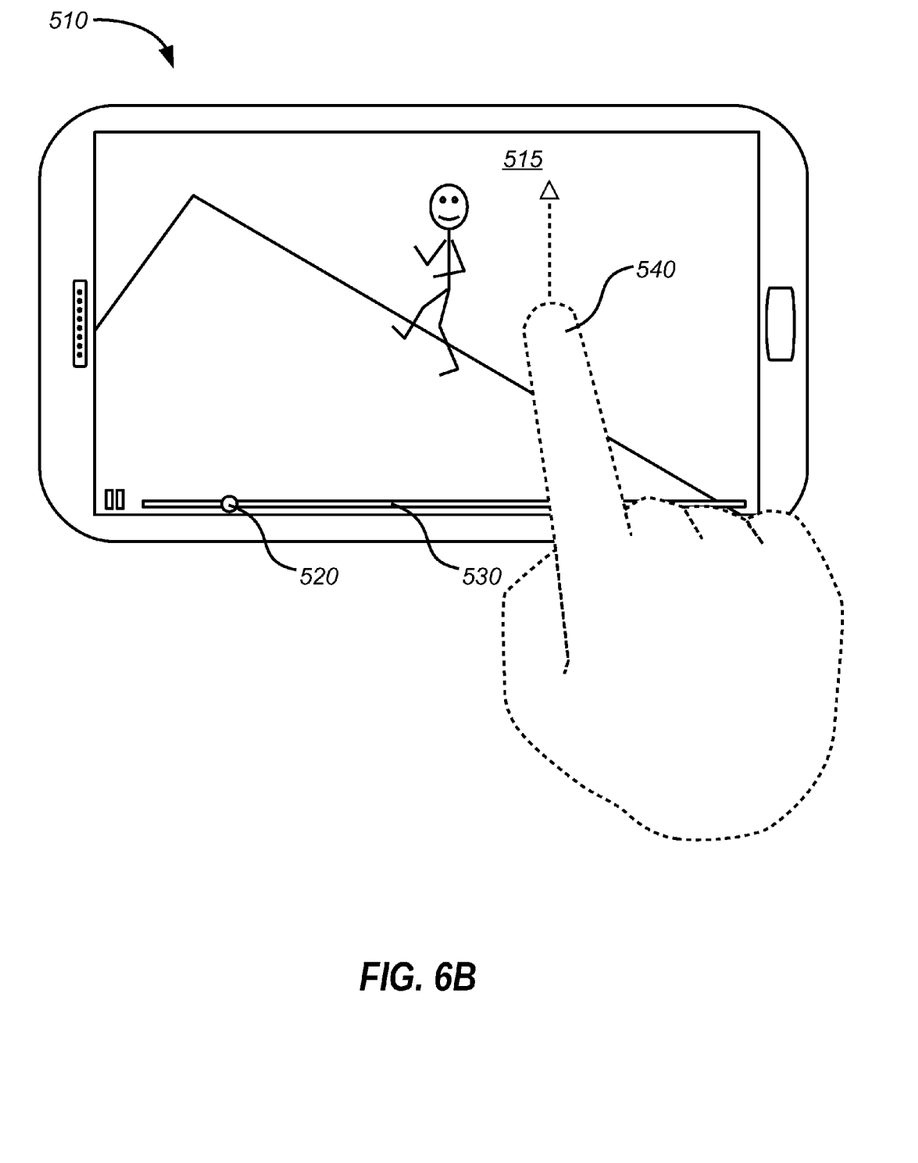
Figure 6C:
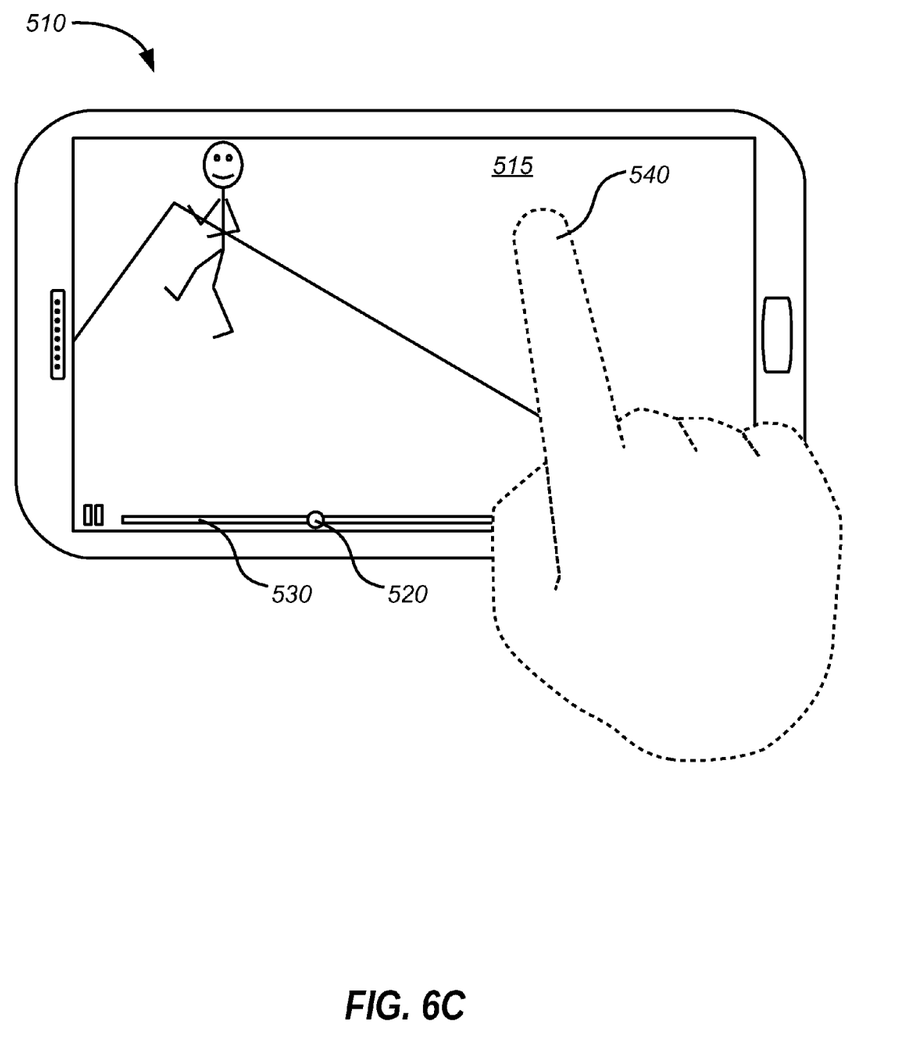

Referring now to FIGS. 6A-6C, a video is played on mobile computing device 510. In the embodiment depicted, the video window is expanded over the entire display 515 of computing device 510. Video progress bar 530 and video position indicator 520 indicate the video position relative to the entire video length.

In the embodiment depicted in FIG. 6A, a user has begun watching a video. If the user desires to scroll through at least a portion of the video, the user may begin making an input action by placing finger 540 on display 515. Referring to FIG. 6B, as the user begins swiping finger 540 up, playback of the video is advanced according to the offset/scrolling ratio. As the video advanced forward, video progress bar 530 and video position indicator likewise advance to reflect the video position 520. Referring to FIG. 6C, the user has swiped finger 540 up, thus further advancing forward playback of the video. In one embodiment, the user could advance the video in either direction by moving finger 540 down or up. In embodiments, if the user desired to play the video quickly, faster movements of finger 540 could be made, resulting in correspondingly faster video scrolling. Likewise, slower swiping of finger 540 can result in slower video scrolling. In various embodiments, input actions comprise combinations of upward and sideways movement and/or downward and sideways movement.

In various embodiments, as a video scrolling action is carried out, sound may be played synchronized to the video frames. In one embodiment, sound is played only while videos are scrolled forward. In another embodiment, sound is played for videos scrolling forward or backward.

As discussed herein, video frames are displayed based on the user's finger movement with respect to a device touchscreen or other action inputs with respect to a computer peripheral or other input device. If the user's finger movement is fast, the video content may resemble actual video playback or may be played back at speeds faster than a normal playback speed. However, if the input action movement is slow, the video frames may be presented in more of a frame-by-frame (or "flip book") manner.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for scrolling through a video, comprising:
   receiving a video asset, the video asset comprising a video segment length;
   detecting an input action performed by a user operating on an input object;
   determining a current coordinate set for the input object;
   determining an offset for the input object;
   determining a velocity for the input object;
   determining a cumulative scrolling offset, the cumulative scrolling offset corresponding to a quantity of full-length swipes selected to be equivalent to the video segment length;
   determining an offset/scrolling ratio for the video asset using the cumulative scrolling offset and the video segment length, wherein determining the offset/scrolling ratio comprises:
      determining a quantity of frames in the video asset and dividing the cumulative scrolling offset by the quantity of frames;
   calculating a Seek To time value by dividing the offset by the offset/scrolling ratio; and
   playing, at a playback speed that corresponds to the velocity for the input object, the video asset to the Seek To time value.

2. The method of claim 1, further comprising determining if the Seek To time value falls within the video segment length.

3. The method claim 1, wherein playing the video asset to the Seek To time value comprises:
   comparing the Seek To time value to the video segment length;
   if the Seek To time value is greater than zero and less than the video segment length, playing the video asset to the Seek To time value; and
   if the Seek To time value is greater than the video segment length, zero, or less than zero, playing the video asset to a playback end point.

4. The method of claim 3, wherein:
   if the offset is positive, the playback end point comprises an end of the video; and
   if the offset is negative, the playback end point comprises a beginning of the video.

5. The method of claim 1, wherein the input action comprises a lateral movement.

6. The method of claim 1, wherein the input action comprises a finger placed on a touch-sensitive surface and swiped along the surface.

7. The method of claim 1, wherein the input action comprises a click and drag action with a computer mouse.

8. A computer-implemented method for scrolling through a video, comprising:
   at a mobile computing device, receiving the video, the video comprising multiple frames;
   on a touch-sensitive display of the mobile computing device, displaying a video display view;
   at the video display view, detecting an input action performed by a user operating on an input object;
   determining an offset of the input action;
   determining a velocity of the input action;
   determining a cumulative scrolling offset, the cumulative scrolling offset corresponding to a quantity of full-length swipes selected to be equivalent to a quantity of frames of the video;
   determining an offset/scrolling ratio for the video using the cumulative scrolling offset and the number of frames of the video, wherein determining an offset/scrolling ratio comprises:
      determining the quantity of frames in the video and dividing the cumulative scrolling offset by the number of frames of the video;
   calculating a Seek To time value by dividing the offset by the offset/scrolling ratio;
   on the touch-sensitive display, sequentially displaying a quantity of selected frames of the video to the Seek to time value at a playback speed that corresponds to the velocity of the input action.

9. The method of claim 8, wherein:
   displaying the quantity of selected frames of the video comprises playing the video to the Seek To time value.

10. The method of claim 9, wherein playing the video to the Seek To time value comprises determining if the Seek To time value falls within the video segment length.

11. The method of claim 9, wherein playing the video to the Seek To time value comprises:
   comparing the Seek To time value to the video segment length;
   if the Seek To time value is greater than zero and less than the video segment length, playing the video to the Seek To time value; and
   if the Seek To time value is greater than the video segment length, zero, or less than zero, playing the video to a playback end point.

12. The method of claim 11, wherein:
   if the offset is a positive offset, the playback end point comprises an end of the video; and if the offset is a negative offset, the playback end point comprises a beginning of the video.

13. A computer-implemented system for scrolling a video comprising:
a video scrolling server comprising a memory and a processor, the memory storing computer-readable instructions directing the processor to:
receive a video asset, the video asset comprising a video segment length;
detect an input action performed by a user operating on an input object;
determine a current coordinate set for the input object;
determine an offset for the input object;
determine a velocity for the input object;
determine a cumulative scrolling offset, the cumulative scrolling offset corresponding to a quantity of full-length swipes selected to be equivalent to the video segment length;
determine an offset/scrolling ratio for the video asset using the cumulative scrolling offset and the video segment length, wherein determining the offset/scrolling ratio comprises:
determining a quantity of frames in the video asset and dividing the cumulative scrolling offset by the quantity of frames in the video asset;
calculate a Seek To time value by dividing the offset by the offset/scrolling ratio; and
play, at a playback speed that corresponds to the velocity for the input object, the video asset to the Seek To time value.

14. The system of claim 13, wherein:
the computer-readable instructions further direct the processor to:
compare the Seek To time value to the video segment length;
if the Seek To time value is greater than zero and less than the video segment length, play the video asset to the Seek To time value; and
if the Seek To time value is greater than the video segment length, zero, or less than zero, play the video asset to a playback end point;
if the offset is positive, the playback end point comprises an end of the video; and
if the offset is negative, the playback end point comprises a beginning of the video.

* * * * *